US012656738B1

(12) United States Patent
Arnold

(10) Patent No.: US 12,656,738 B1
(45) Date of Patent: Jun. 16, 2026

(54) TIDE AND TIME CLOCK

(71) Applicant: Matthew D. Arnold, Urbanna, VA (US)

(72) Inventor: Matthew D. Arnold, Urbanna, VA (US)

( * ) Notice: Subject to any disclaimer, the term of this patent is extended or adjusted under 35 U.S.C. 154(b) by 409 days.

(21) Appl. No.: 18/202,446

(22) Filed: May 26, 2023

Related U.S. Application Data

(60) Provisional application No. 63/350,725, filed on Jun. 9, 2022.

(51) Int. Cl.
*G04B 19/26* (2006.01)

(52) U.S. Cl.
CPC .................................. *G04B 19/266* (2013.01)

(58) Field of Classification Search
None
See application file for complete search history.

(56) References Cited

U.S. PATENT DOCUMENTS

| | | | | |
|---|---|---|---|---|
| 1,375,470 A * | 4/1921 | Shaw | G04B 19/166<br>368/231 |
| 4,853,908 A * | 8/1989 | Bourquin | G04B 19/268<br>968/210 |
| 2006/0171256 A1* | 8/2006 | Herbert | G04C 17/0058<br>368/21 |

FOREIGN PATENT DOCUMENTS

| | | | |
|---|---|---|---|
| CN | 209101523 U * | 7/2019 | |
| GB | 2050656 A * | 1/1981 | G04B 19/266 |

OTHER PUBLICATIONS

Translation of CN209101523U, Espacenet (Year: 2019).*

* cited by examiner

*Primary Examiner* — Renee S Luebke
*Assistant Examiner* — Matthew Daniel Hwang
(74) *Attorney, Agent, or Firm* — Heisler & Associates

(57) ABSTRACT

A tide circle is provided as one form of tide indicator which rotates about a pivot point which is spaced from a center of the tide circle. An hour hand also pivots about this pivot point. The tide circle and hour hand are geared together so that the tide circle moves slower than the hour hand an amount correlating with tide change. The tide circle includes high and low tide indicators thereon which align with the hour hand at high or low tide. A window in the hour hand can be provided as a tide scale which aligns with these indicators at high and low tide. A portion of the tide circle within the window indicates whether the tide is increasing or decreasing and current tide magnitude. A face of the clock includes markings and indicia to facilitate reading of time with the hour hand.

14 Claims, 5 Drawing Sheets

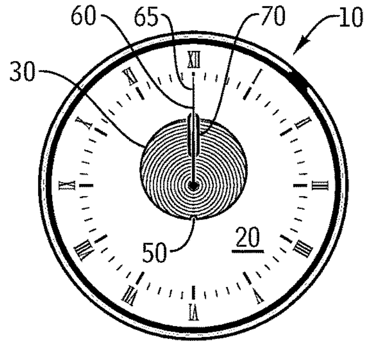
*Fig.* 3 Noon, High Tide
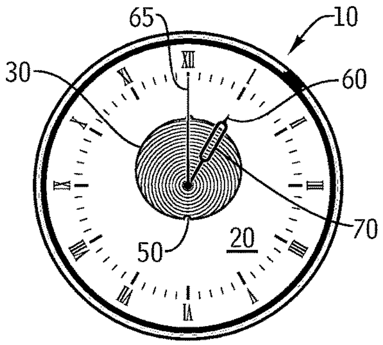
*Fig.* 4
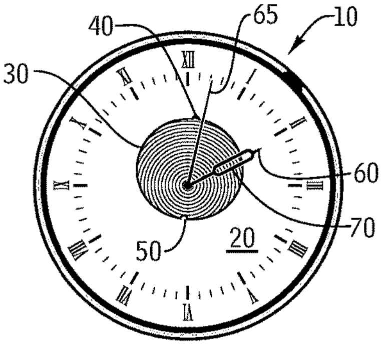
*Fig.* 5
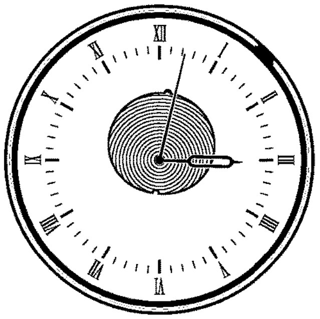
*Fig.* 6
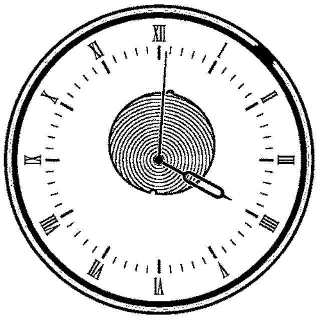
*Fig.* 7
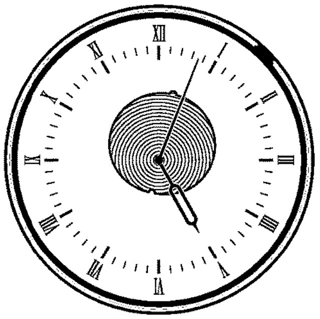
*Fig.* 8
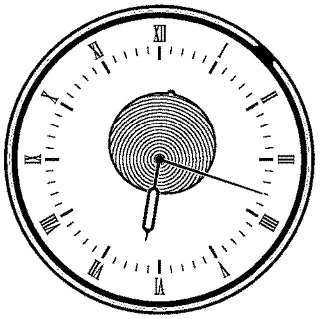
*Fig.* 9 Low Tide
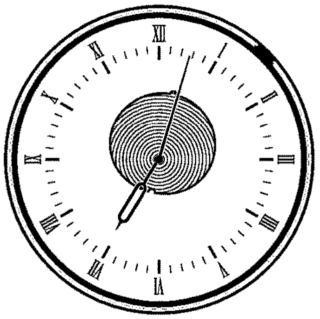
*Fig.* 10
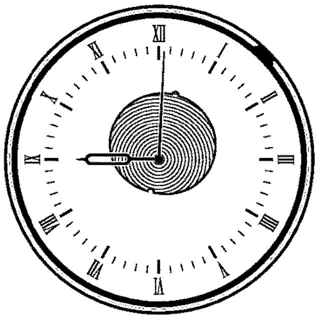
*Fig.* 11
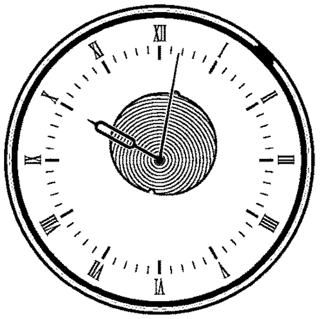
*Fig.* 12
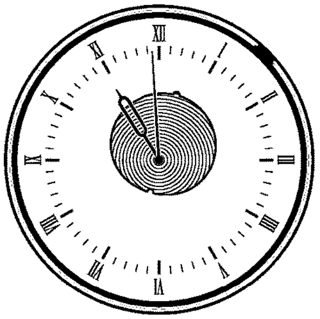
*Fig.* 13
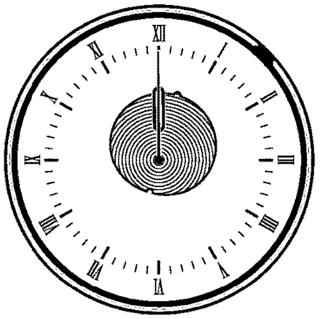
*Fig.* 14 Midnight

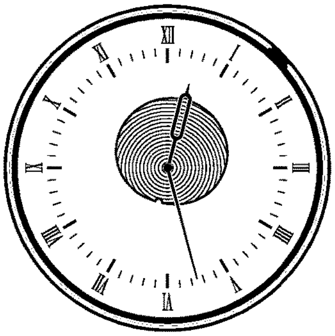
*Fig.* 15 High Tide
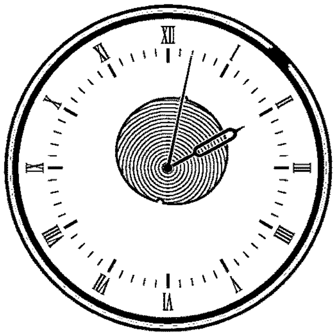
*Fig.* 16
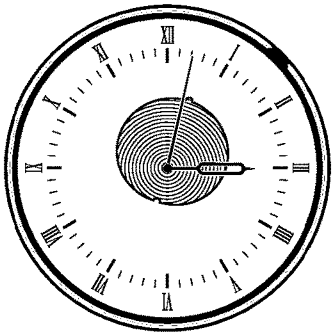
*Fig.* 17
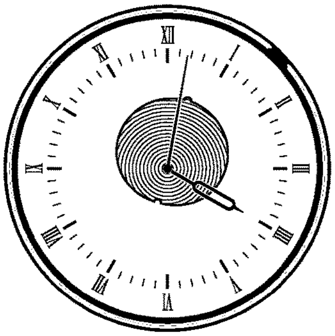
*Fig.* 18
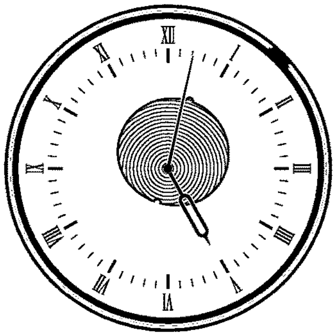
*Fig.* 19
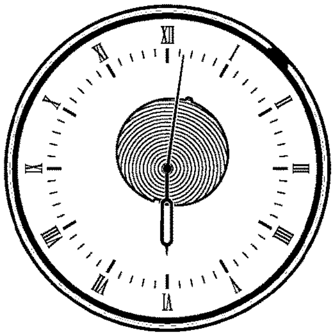
*Fig.* 20
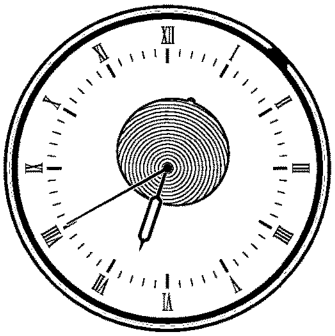
*Fig.* 21 Low Tide
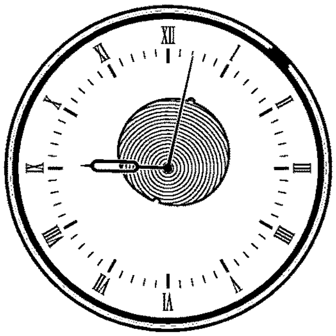
*Fig.* 22
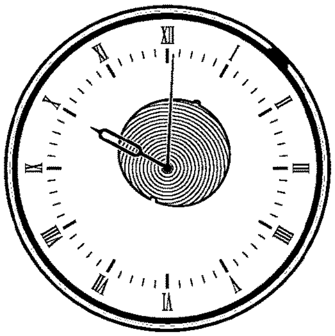
*Fig.* 23
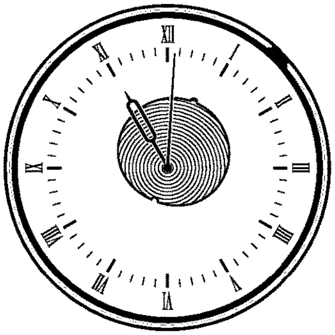
*Fig.* 24
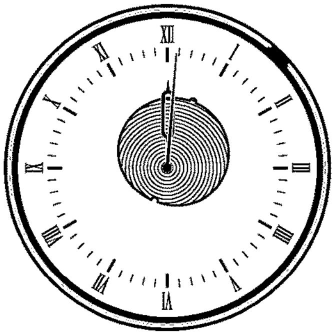
*Fig.* 25 Noon
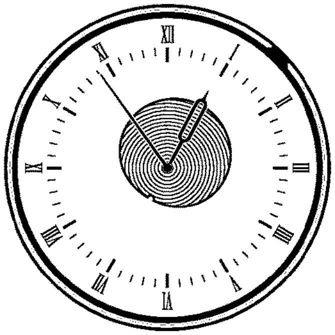
*Fig.* 26 High Tide

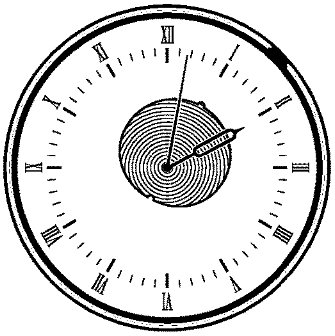
*Fig.* 27
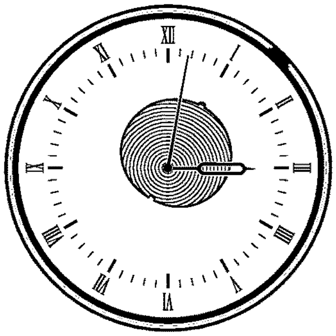
*Fig.* 28
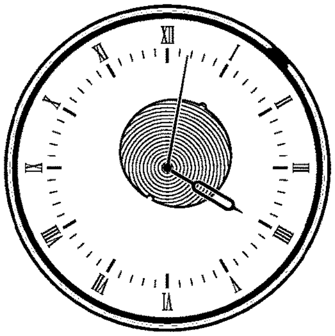
*Fig.* 29
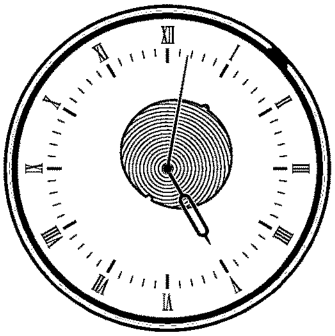
*Fig.* 30
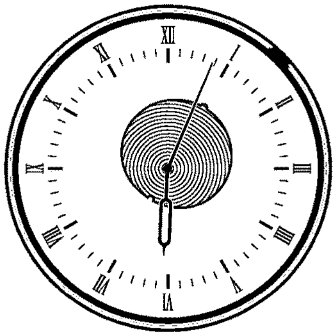
*Fig.* 31
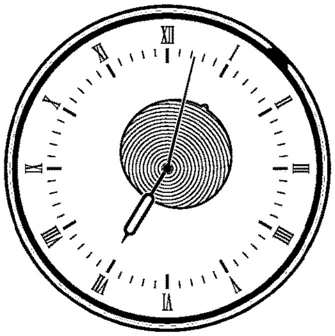
*Fig.* 32 Low Tide
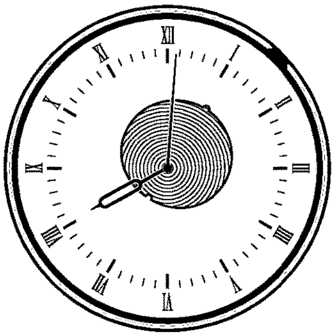
*Fig.* 33
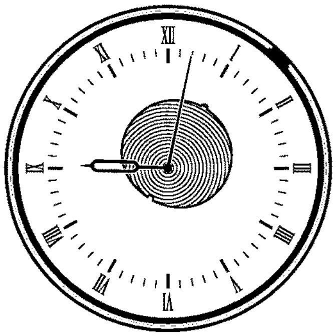
*Fig.* 34
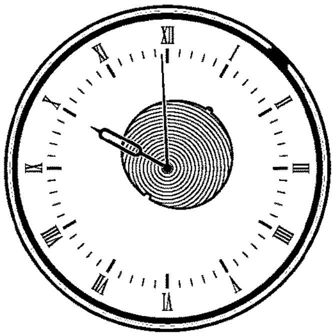
*Fig.* 35
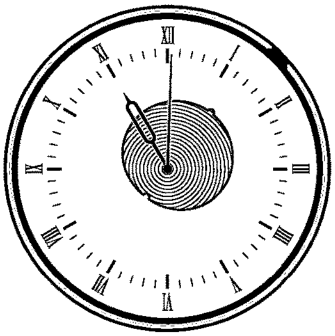
*Fig.* 36
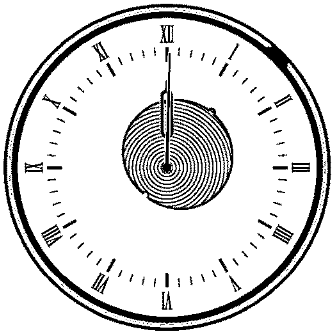
*Fig.* 37 Midnight
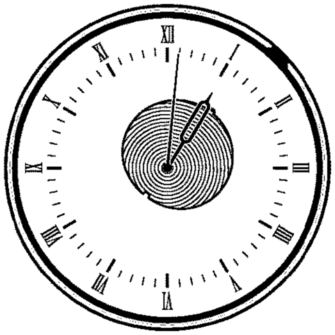
*Fig.* 38

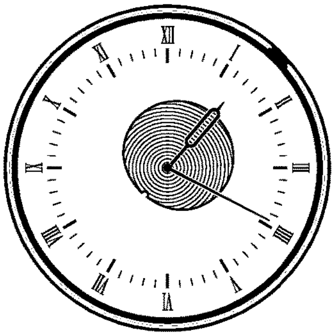
*Fig.* 39 High Tide
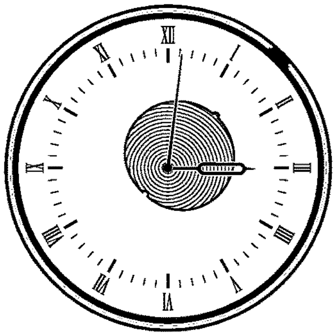
*Fig.* 40
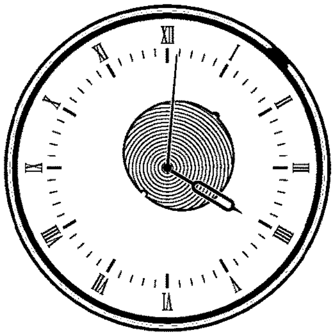
*Fig.* 41
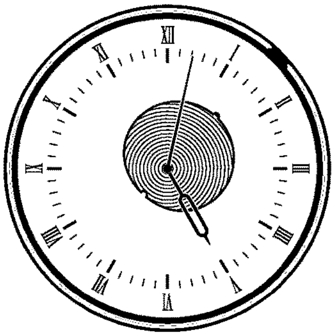
*Fig.* 42
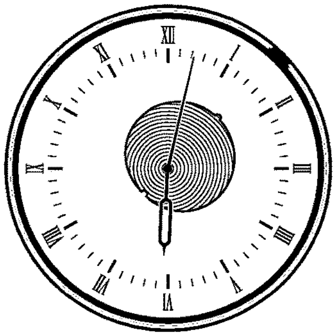
*Fig.* 43
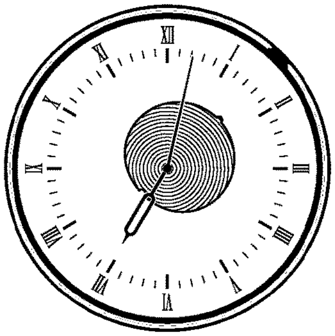
*Fig.* 44
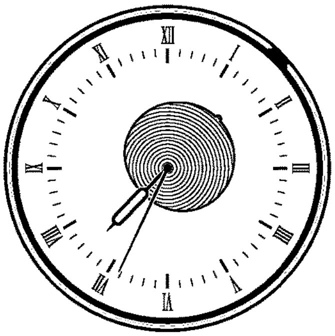
*Fig.* 45 Low Tide
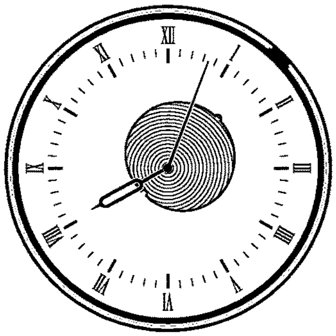
*Fig.* 46
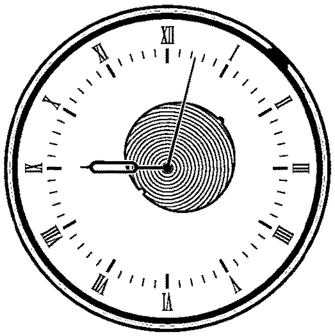
*Fig.* 47
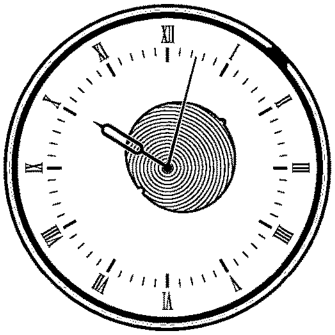
*Fig.* 48
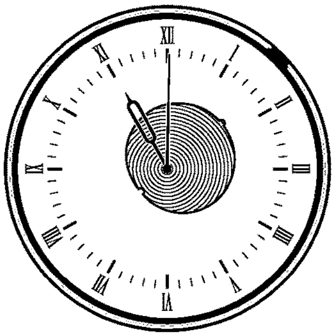
*Fig.* 49
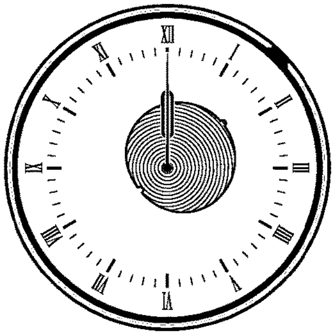
*Fig.* 50 Noon

TIDE AND TIME CLOCK

CROSS-REFERENCE TO RELATED APPLICATIONS

This application claims benefit under Title 35, United States Code § 119 (e) of U.S. Provisional Application No. 63/350,725 filed on Jun. 9, 2022.

FIELD OF THE INVENTION

The following invention relates to clocks and especially clocks which display both time and status of the tides.

BACKGROUND OF THE INVENTION

Clocks of various types have been known since antiquity. Clocks with geared rotating mechanisms date back to before the printing press and include a basic mechanism which has remained substantially unchanged for centuries. A clock face includes markings that are on and circling a central pivot. At least one "hour hand" rotates about this pivot, with the tip of the hour hand pointing at an hour marking at various hour positions. Many such clocks have twelve hour positions and the hour hand makes two full circuits about the pivot per day.

To drive such standard clockworks, some form of torque energy is supplied to cause the hour hand to rotate. This source of torque energy can be in the form of weights suspended from pulleys, gears or other portions of the clock, or can include a spring (such as a clock spring) which can apply torque to drive the clockworks. Finally, clockworks limit a speed at which the hour hand moves, which for many clocks is a pendulum, but can be other mechanisms, such as friction-based mechanisms, etc. These clockworks also typically include gears between the source of torque and the hour hand, so that the hour hand is appropriately "timed" to advance precisely over predefined time periods. Other "hands" can be geared to the hour hand (or vice versa) such as a minute hand and/or second hand, to provide further time information.

It is known to enhance standard clockworks in various different ways. Some clocks include tracking of days, weeks and/or months, such as through utilizing appropriate gears to cause indicators of other time periods to advance precisely when called for by the passage of corresponding amounts of time. Other time associated characteristics are also known to be displayed as enhancements to standard clockworks, such as indicators of daylight and nighttime hours, for instance.

In more modern times, many clocks have become electrified. A source of electric power, often a battery, supplies power into the clock. Timing of an electric clock can occur through utilizing an appropriate microelectronics "clock chip," a piezo-electric crystal, or some other known timing mechanism. Electrified clocks can be hybrid with some mechanical elements therein, or can merely have a rotational device, such as a stepper motor, coupled directly to the hand (or hands) of the clock for powering thereof directly. At another extreme, even a hand (or hands) can be virtual in nature, with the time displayed electronically on a display (e.g. an LED or LCD display). This time display can be in the appearance of hands and with hour markings around the circle, or can have any other variety of other different appearances. Some electronic clocks mimic mechanical clocks in appearance to provide an aesthetic similar to that provided by the mechanical clock, but without requiring periodic maintenance, such as winding springs or raising weights.

The changing of the tides of Earth's oceans is known to be a highly predictable phenomena, controlled by the moving of the moon relative to the Earth, primarily. While high and low tides vary at different locations on Earth, once a particular location's high tide and/or low tide is known, the precise timing of future high and low tides can be precisely determined, as it merely follows the period of rotation of the moon about the Earth. Because a high tide is experienced both when a point on the Earth is near the moon or opposite the moon, typically two high tides and two low tides are experienced each day. The tide cycle is slightly longer than the Earth's twenty-four hour day/night cycle. In locations with very little tide, tracking of tides is of no particular use, so that regions with only a single high tide and single low tide generally do not call for tracking and display of tide status.

While clocks have a primary functional purpose of telling the time, they also have ancillary purposes. A well crafted clock can be an exceptional decoration for the enhancement of a living and/or working space, typically an indoor space frequented by individuals who might appreciate such a clock. An interesting clock can be a conversation starter and can enhance one's understanding of time and the correlation of different astronomical events to time.

Prior art clocks have not entirely satisfied the need for a clock which relatively accurately tracks both time and tide status, and does so in a way which is of a unique appearance which also can inform as to many different aspects of time and tides, as well as their correlation together. Accordingly, a need exists for such a time and tide clock that informs the viewer at a single glance both the current time and the state of the tide.

SUMMARY OF THE INVENTION

With this invention, standard prior clockworks for driving at least an hour hand are modified to include an additional "hand," referred to herein as a tide circle, which provides one form of tide indicator that rotates about the pivot at the center of the clock at a speed that is in sync with the tides. In one embodiment, the hour hand includes a tide scale or other indicator thereon which continuously "reads" the tide circle to provide current details about the tide.

The tide circle itself is circular in form in one example embodiment, but could have other shapes. Importantly, the tide circle is not mounted to rotate about a center of the tide circle. Rather, a pivot point is provided which is spaced away from a center of the circle. In one embodiment, this positioning is half of a radius of the circle away from the center point, so that the pivot point of the circle is midway between the center of the circle and an edge of the circle. A size of the circle is such that all portions of the circle remain inboard of the hour indicia and hour marks which circumscribe the pivot point. Thus, the tide circle is active at a central hub region of the circular clock face, inboard of the hour markings.

The tide circle is affixed to gears which are geared off of the hour hand of the clockworks (or vice versa) with appropriate gearing to cause the tide circle to rotate once every 14.4 days (thus ten rotations every 144 days) and about 25° of rotation per day. Such an arrangement is suited for a twelve hour clock face, and generally aligns with the lunar cycle which drives the tides, and which causes a full cycle of the tides to occur every month or so (actually slightly less than one month).

With such rotation of the tide circle, a gear train reduction of 10:288 is provided between the hour hand and the tide circle. Various different gear mechanisms could be utilized to supply this gear reduction amount between the hour hand and the tide circle. Concentric shafts and other mechanisms located inline with the pivot point of the clock can allow for pivoting of the tide circle as well as the hour hand (and any other hands) about this common pivot point.

As one example gearing mechanism to implement this invention, the hour hand can have an output spur gear. The tide circle can have an input spur gear. The output spur gear is fixed to the hour hand so that it rotates with the hour hand. The input spur gear is fixed to the tide circle to rotate with the tide circle. Then, a gear train of one or more gears or other elements having different numbers of teeth and appropriate gear ratios interconnect the output spur gear of the hour hand to the input spur gear of the tide circle. Thus, as the hour hand rotates, the tide circle is also caused to rotate, but more slowly and with a 10:288 ratio.

While this basic arrangement is contemplated for a mechanical clock, the entire correlation could be mimicked electronically. The tide circle could be driven by an output shaft either at a common pivot point with the hour hand and other hands of such an electronic clock, or with different pivot points, but preferably with the hour hand and tide circle pivoted about a common point at a central hub of a face of the clock. Alternatively, the "hands" and tide circle can merely be displayed on a display mimicking how mechanical clock works would present the hour hand and tide circle relative to each other, and still function according to one embodiment of this invention. With an electronic analog clock, "gearing" would be provided by software or firmware or other electronics which in one embodiment could continuously synchronize the display with publicly available tide station data of the user's choice.

Unlike traditional hands of a clock, the tide circle only generally identifies the tide by pointing to the fixed hour marks on the clock. Rather, the tide circle includes at least one, and two (but optionally more) points on a perimeter thereof, including a high tide point/dot and a low tide point/dot. These points are opposite each other and with the low tide point defining a point on the tide circle closest to a pivot point of the tide circle and the high tide point being a point on the tide circle most distant from the pivot point of the tide circle. In one embodiment, the low tide "point" is a circular "divot" in the tide circle of a similar size to the high tide pool/dot.

These points on the tide circle are read relative to the hour hand. In particular, when the hour hand passes through the high tide dot, it is high tide. When the hour hand passes through the low tide point, it is low tide. In one example embodiment, and to provide further information to an observer of the time and tide clock, the hour hand is modified to include a tide scale to measure somewhat the current state of the tide. In one embodiment, this tide scale includes an elongated oval window between a hub of the hour hand adjacent to the pivot point and a tip of the hour hand most distant from the pivot point. A width of this elongated oval is preferably similar to a width of the dots/divots. A length of this oval is preferably similar to a difference between a distance of the low tide point from the pivot point and a distance of the high tide point from the pivot point. Thus, the high tide dot and low tide dot (or divot) both pass through the indicator window in the hour hand, but the low tide dot passes through the low "hub" end of the window (actually leaving the indicator window empty when the low tide point is a "divot" in the tide circle) and the high tide dot passes through the high "tip" end of the window.

Preferably, the tide circle is formed of a color or pattern (or at least with a contrasting outline) to allow a perimeter of the tide circle to always be visible through the indicator window of the hour hand. The portion of the tide circle viewed within the window is always angled somewhat except at high tide and low tide. The slope of this angle of the tide circle relative to the indicator window in the hour hand indicates whether the tide is rising or falling. When a leading edge of the hour hand shows the tide circle closer to the free tip of the hour hand than the trailing edge of the hour hand, the tide is rising. When a leading edge of the hour hand shows the tide circle closer to the pivot point of the hour hand than the trailing edge of the hour hand, the tide is ebbing. The closeness of the tide circle to the high end of the window or the low end of the indicator window (or other tide scale) indicates if the tide is closer to high or closer to low, and to what degree. Thus, one can read not only when high tide and low tide occurs but also can read whether the tide is currently rising or falling and whether and to what degree the tide is closer to "high" or closer to "low." The indicator window or other tide scale could include markings and indicia, such as with percent readings of full tide (e.g. 90%, 80% . . . 20%, 10%) to measure how high the tide currently is relative to average high and low tides.

Furthermore, one can look at an angular spacing between the high tide and low tide dots relative to the hour hand and, because the tide circle rotates so slowly, can fairly accurately determine how long it will be until the next high tide or the next low tide. In particular, this spacing indicates how long it will be until the hour hand intersects the high tide dot of the tide circle or the low tide dot of the tide circle. One can then make corresponding plans to participate in activities which are best conducted at high tide or low tide.

To address the problem of time change, the face of the clock which includes hour markings or other indicia thereon, such as twelve hour markings, is preferably rotatable (at least by one-twelfth of a full circle) relative to the clockworks mechanism of the clock, including the tide circle and the hour hand (and any other hands). By placing these twelve hour markings on a separate rotatable structure, and rotating this structure one-twelfth of a full rotation, the time change is accounted for. While this would leave 12 o'clock angled away from straight up vertically, suspension mechanisms for suspension of the clock on a wall can include two sets of laterally spaced support elements, such as with two of the support elements at a 3 o'clock position and a 9 o'clock position for regular time, and with two of the support elements at a 4 o'clock and a 10 o'clock position for daylight savings time.

OBJECTS OF THE INVENTION

Accordingly, a primary object of the present invention is to provide a clock which also reads the status of the tide.

Another object of the present invention is to provide a tide clock which uses interaction between a tide indicator and an hour hand to display current tide status.

Another object of the present invention is to provide a tide clock which displays current time, current tide status, and whether the tide is increasing or decreasing.

Another object of the present invention is to provide a time clock which displays, at least generally, when the next high or low tide will occur.

Another object of the present invention is to provide a tide clock which can function either mechanically, electrically or through a combination of electrical and mechanical means.

Another object of the present invention is to provide a tide clock which also reads current time and which can be adjusted between standard time and daylight time.

Another object of the present invention is to provide a method for displaying both time and tide status on a single device.

Another object of the present invention is to provide a method for mechanically configuring a clock to display both time and tide status.

Other further objects of the present invention will become apparent from a careful reading of the included drawing figures, the claims and detailed description of the invention.

BRIEF DESCRIPTION OF THE DRAWINGS

FIGS. 3-50 are front elevation views, similar to that which is shown in FIG. 1, but for progressively advancing times and illustrating how the movement of an hour hand and the movement of a tide circle are coordinated by this invention.

DESCRIPTION OF THE PREFERRED EMBODIMENT

Figure 1:
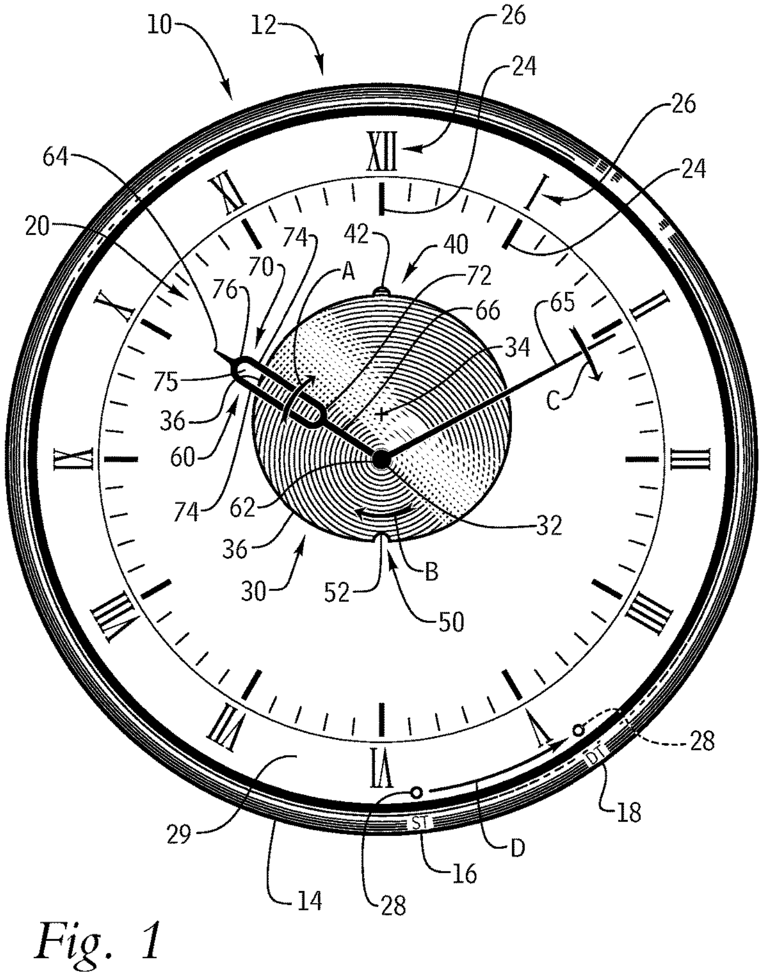
FIG. 1 is a front elevation view of a clock according to an example embodiment of this invention, which displays both time and tide status.

Referring to the drawings, wherein like reference numerals represent like parts throughout the various drawing figures, reference numeral 10 is directed to a clock (FIGS. 1 and 2), which displays both time and tide details. Tide status is shown by interaction between a tide circle 30 and an hour hand 60 as they pivot about a common central hub 25 of a face 20 of the clock 10.

Figure 2:
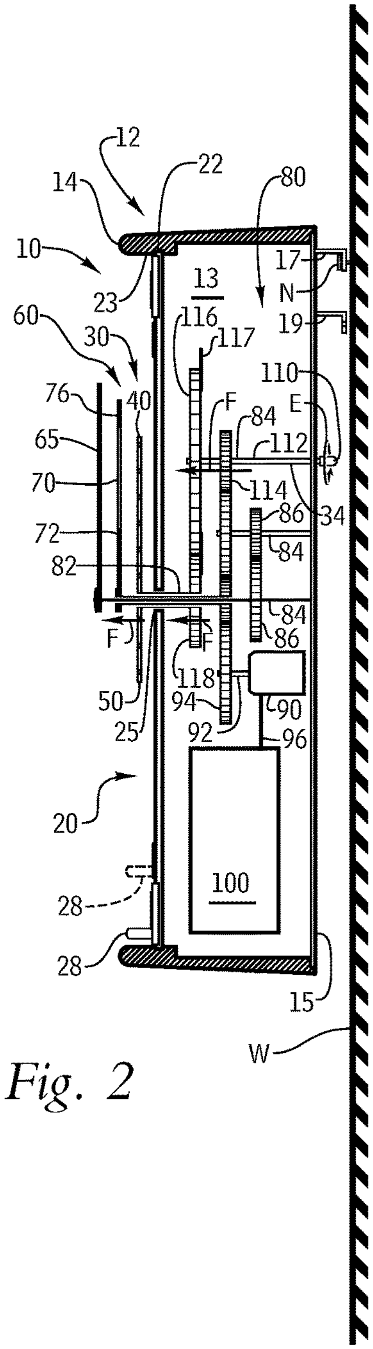
FIG. 2 is a side elevation view of the clock of FIG. 1 and with an outer housing cut away to review interior details thereof.

In essence, and with particular reference to FIGS. 1 and 2, basic details of the clock 10 are described according to an example embodiment. The clock 10 is configured to both display time and also tide details. The clock 10 includes a housing 12 holding various parts of the clock 10 together. A face 20 is planar and defines a front of the housing 12. A tide circle 30 is pivotably supported at a central hub 25 of the face 20. A high tide point 40 and low tide point 50 are provided upon the tide circle 30. An hour hand 60 is also pivotably attached about the central hub 25 of the face 20. The tide circle 30 is geared together with the hour hand 60 so that they move together. However, any minute hand 65 is geared to move sixty times faster than the hour hand and the tide circle 30 is configured to rotate slower than the hour hand, at a ratio matching a correlation between movement of the tides and passage of hours of time. An indicator window 70 or other side scale on the hour hand 60 displays a portion of an outer edge 36 of the tide circle 30 and "measures" how high the tide is presently. An angle of this outer edge 36 within the indicator window 70 indicates whether the tide is increasing or decreasing, as well as how rapidly it is changing.

A gear set 80 (FIG. 2) is coupled to the tide circle 30, hour hand 60 and optional minute hand 65 to cause appropriate relative rotation therebetween. A driver 90 drives the gear set 80 and in turn drives the tide circle 30, hour hand 60 and any minute hand 65. A battery 100 or other power source powers the driver 90. A tide adjustment knob 110 can optionally be provided as one convenient subsystem for making periodic adjustments between the tide circle 30 and hour hand 60, such as during initial set up to correlate time with local tides and/or to make periodic fine tuning adjustments as needed.

More specifically, and with continued reference to FIGS. 1 and 2, basic details of the housing 12 are described which contain major portions of the clock 10 according to this example embodiment. In this embodiment, the housing 12 is generally cylindrical in shape and surrounds a generally cylindrical interior space 13. The housing 12 includes a rim 14 defining a circumferential perimeter boundary of the housing 12. This rim 14 preferably extends forwardly past the face 20 somewhat.

A rear wall 15 is preferably provided parallel with the face 20 and oriented in a plane perpendicular to a central axis of the housing 20 and perpendicular to the rim 14. A daylight time hook 19 and standard time hook 17 act as preferred forms of suspension elements on the rear wall 15, which allow the housing 12 and the clock 10 to be supported upon a nail N or other protruding element extending from a wall W, upon which the clock 10 is mounted, in one embodiment. The rear wall 15 can also act as support for axles 84 within the gear set 80 in some embodiments. The rear wall 15 could conceivably be omitted, with the hooks 17, 19 (or other attachments) merely mounted to a portion of the rim 14. The housing 12 can include an openable door, such as adjacent to a battery 100 or other power source to facilitate replacement of batteries 100 as needed.

With continuing reference to FIGS. 1 and 2, specific details of the face 20 are described according to this example embodiment. The face 20 defines a forward boundary of the clock 10 and provides a surface upon which hour marks 24 and hour indicia 26 (as well as potentially other marks and indicia) can be placed to be visible to a user when reading the clock 10. The marks 24 and indicia 26 communicate where the hour hand 60 (and minute hand 65) are pointing, indicative of present time.

The face 20 is a thin planer structure of circular form (or other perimeter form, if the housing 12 has a non-circular cross-section). The face 20 has a perimeter edge 22 which is circular. In one embodiment, this perimeter edge 22 is supported within a slot 23 cut into an interior of the rim 14 of the housing 12. While the face 20 can be affixed to the housing 12, in this example embodiment the face 20 can rotate relative to the rim 14 of the housing 12. The slot 23 in the rim 14 acts as a race, guiding the perimeter edge 22 of the face 20 as it rotates relative to the housing 12.

A standard/daylight selector peg 28 can be mounted on a forward side of the face 20 to facilitate such rotation of the face 20 relative to the housing 12. Such rotation would cause the face 20 to rotate relative to the housing 12 and also relative to the tide circle 30, hour hand 60 and minute hand 65, as well as relative to the gear set 80 and other components within an interior space 13 of the housing 12 of the clock 10.

Such rotation of the face 20 provides one way to accommodate changes between standard time and daylight time. Standard timing indicia 16 and daylight time indicia 18 are preferably provided on the housing 12 in this embodiment which allow for the standard/daylight selector peg 28 to be precisely positioned where desired when accommodating changes from standard time to daylight time. Furthermore, the standard time hook 17 and daylight time hook 19 on the rear wall 15 can be selected for use, which causes the entire clock 10 to rotate 30°. In this way, a 12 o'clock position of the clock 10 can remain vertically upward, even after the face 20 has been rotated 30°, and the clock 10 can thus simply and conveniently accommodate changes between standard time and daylight time.

The face 20 includes hour marks 24 (and also minute marks in this embodiment which are located between the hour marks 24). Hour indicia 26 are provided adjacent to the hour marks 24. In this embodiment, the hour indicia 26 are represented by roman numerals. As an alternative, regular Arabic numbers could be utilized or only some of the hour marks 24 could have an associated hour indicia 26 adjacent thereto. The hour indicia 26 could be on a separate annular ring 29 from other portions of the face 30. In such an embodiment, only the ring 29 would be rotated to accommodate daylight time, rather than the entire face 30. The hour marks 24 could be either on the ring 29 or on other portions of the face 30 just inside the ring 29.

While twelve hour marks 24 are provided in this embodiment and the clock 10 is configured to display twelve hour time and for the hour hand 60 to make two circuits every day, other configurations could be provided in alternative embodiments. For instance, the face 20 could be configured with twenty-four hour marks and such a clock could be configured, so that the hour hand only makes one circuit per day, with appropriate gearing to make an alternate clock according to this invention, which is a twenty-four hour clock, rather than a twelve hour clock. Other adjustments and alternative embodiments could be made. Thus, a number of hour marks 24 and a number of hour indicia 26 can be adjusted as desired according to various alternate embodiments.

It will be recognized that when the clock 10 has twelve hour marks and the hour hand 60 is configured to make two circuits per day, that the tide circle 30 will generally display two high tides and two low tides each day. Some areas of the Earth only have a single high tide per day and a single low tide. However, such locations have exceptionally small changes in the tides and thus generally have limited benefit to displaying the status of tides for such locations.

With particular continuing reference to FIGS. 1 and 2, details of the tide circle 30 are described, according to this example embodiment. The tide circle 30 provides one form of tide indicator according to this embodiment. This tide circle 30 has a circular outer edge 36, maintaining an equal distance away from a central point 34 of the tide circle 30. The tide circle 30 also has a pivot point 32 which is spaced away from the central point 34. In one embodiment, the spacing of the pivot point 32 away from the central point 34 is approximately half of a distance between the central point 34 and the outer edge 36.

With such a pivotable orientation for the tide circle 30, a majority of an area of the tide circle 30 is always provided on one side of the tide circle 30 relative to an opposite side of the tide circle 30. A high tide point 40 is located on the outer edge 36 of the tide circle 30 at a point where the outer edge 36 is most distant from the pivot point 32. A low tide point 50 is provided on the outer edge 36 of the tide circle 30 which is located where the outer edge 36 is closest to the pivot point 32 of the tide circle 30. An an option, regions with unusual tides, such as near river mouths could benefit from use of a specialty tide circle provided which could replace the tide circle 30. Alternatively, such a specialty tide circle could be attached to and overlie the tide circle 30. If the specialty tide circle is slightly larger in diameter, it can fully cover the tide circle 30 and leave the outer edge of the specialty tide circle visible to interact visually with the hour hand 60 and indicator window 70 to indicate tide status. As an option, the specialty tide circle might have the points 40, 50 not entirely opposite each other, to reflect river flow affects on the tide.

The high tide point 40 is preferably defined by a convex surface 42 which extends radially outwardly from adjacent portions of the outer edge 36 of the tide circle 30. A diameter of this high tide point 40 is preferably similar to a width of an indicator window 70 within the hour hand 60 (described in detail below). Similarly, a concave surface 52 of the low tide point 50 has a width similar to this with of the indicator window 70 on the hour hand 60.

While the tide circle 30 is in this embodiment presented as a circle, the tide circle 30 could be replaced with some other type indicator that is not circular in form. For instance, such an alternate tide indicator could be square in form or oblong in shape, or configured like some other hand on the clock 10. The high tide point 40 points to an area on the face 20 of the clock 10 which generally indicates at what time high tide will next occur. Similarly, the low tide point 50 generally points to a portion of the face 30 representing when the next low tide will occur.

Furthermore, by constructing the tide indicator as the tide circle 30, a portion of the outer edge 36 which is located within the indicator window 70 (or other tide scale) provides a representation of whether the tide is currently increasing or decreasing (and also a rate of increase or decrease). In particular, the portion of the outer edge 36 within the indicator window 70 always has a "higher edge" and "lower edge" adjacent to opposing ones of arms 74 on lateral sides of the indicator window 70. The hour hand 60 is moving clockwise. If the leading arm 74 of the indicator window 70 on the hour hand 60 has the outer edge 36 establishing the higher edge and the trailing arm 74 of the indicator window 70 on the hour hand 60 has the outer edge 36 establishing the lower edge, then the tide is increasing. If the opposite configuration is displayed, then the tide is decreasing. A relative difference between the higher edge and the lower edge of the outer edge 36 within the indicator window 70 indicates whether the tide is changing rapidly or slowly.

Furthermore, if the outer edge 36 is closer to an upper junction 76 at the indicator window 70, this represents that the tide is currently closer to high tide. If the portion of the outer edge 36 within the indicator window 70 is closer to a lower junction 72 of the indicator window 70, this indicates that the current tide is closer to low tide. A relative location of the outer edge 36 between the upper junction 76 and lower junction 72 provides a representation of whether the current tide is closer to high tide or closer to low tide and to which degree the tide is currently higher than average or lower than average (or perhaps precisely average if the outer edge 36 with an indicator window 70 is at a midpoint between the upper junction 76 and lower junction 72). The arms or other structures on the hour hand can be configured with indicia and/or marks to represent, such as by percentages, how close the tide magnitude displayed by the clock is to the high tide's magnitude (as a percent in one embodiment).

At the moment of high tide, the high tide point 40 will be entirely within the window 70 adjacent to the upper junction 76 and filling the upper end of this indicator window 70 adjacent to the upper junction 76, due to the size and shape of the high tide point 40 and its convex surface 42 matching a width of an opening 75 of the indicator window 70. Similarly, when the low tide point 50 is aligned with the indicator window 70, the window 70 will be entirely empty due to the presence of the concave surface 52 cutting into the outer edge 36 in the tide circle 30, and due to a size of a concave surface 52 matching a width of the opening 75 of the window 70.

With particular reference to FIGS. 1 and 2, details of the hour hand 60 and its associated indicator window 70 are described, according to this example embodiment. The hour hand 60 includes a pivot 62 adjacent to the central hub 25 of the face 20 and the axial centerline of the housing 12 of the clock 10. This hour hand 60 extends from the pivot 62 along a leg 66 to a tip 64 defining a portion of the hour hand 60 most distant from the pivot 62. An indicator window 70 is located between the pivot 62 and the tip 64 and with a majority of the leg 66 between the indicator window 70 in the pivot 62. A minute hand 65 is also provided in this embodiment as an option, geared to rotate sixty times faster than the hour hand 60.

The indicator window 70 defines an oblong portion of the hour hand 60 with an opening 75 therein. This opening 75 is also oblong in shape, so that the indicator window 70 is defined by two arms 74 extending in a parallel fashion between a semi-circular lower junction 72 and a semi-circular upper junction 76. The lower junction 72 attaches to portions of the leg 66 adjacent to the pivot 62. The upper junction 76 attaches to the hour hand 60 adjacent to the tip 64. The opening 75 in the indicator window 70 causes the indicator window to act as a form of tide scale which measures a status and magnitude of the tide, as well as whether the tide is increasing or decreasing and a rate at which the tide is increasing or decreasing. While the indicator window 70 is shown with two parallel arms 74 and defining a complete circuit that are surrounding the opening 75 at the indicator window 70, it is conceivable that the hour hand 60 could be constructed with a single arm 74 extending between lower junction 72 and upper junction 76, and still provide many of the features of this invention. The arms 74 could have other orientations relative to each other, other than parallel, in an alternative embodiment. Indicia such as percentages could be located on the arms 74 or on bridges spanning the opening 75. Other details of the hour hand 60 could be modified in accordance with known prior art configurations for hour hands of time clocks generally.

The hour hand 60 and tide circle 30 (as well as the minute hand 65 in this embodiment) are each caused to rotate appropriately relative to the housing 12 and face 20 by a gear set 80 and an associated driver 90 and battery 100 (or other power source). This gear set 80 could have a variety of different configurations, with one representative configuration depicted herein. The gear set 80 includes multiple separate gears which enmesh together and rotate about various separate axles 84 to cause concentric shafts 82 coupled to the tide circle 30, hour hands 60 (and optional minute hand 65 (and/or second hand)) to rotate appropriately, all powered by the driver 90 and associated battery 100 or other power source.

In this example embodiment, the concentric shafts 82 including an outermost shaft coupled to the tide circle 30, an intermediate shaft coupled to the hour hand 60 and interior shaft coupled to the minute hand 65. The concentric shafts 82 rotatable support each other and are rotatable relative to and supported by the central hub 25 in the face 20. Also, an interior one of the concentric shafts 82 acts as a form of axle for the other concentric shafts 82 and to be rotatably supported at the rear wall 15 of the housing 12, in one embodiment.

Gear ratios are selected so that the driver 90 and an associated output shaft 92 and drive gear 94 thereof result in rotation of the tide circle 30, hour hand 60 and minute hand 65 at appropriate ratios relative to each other so that accurate time is kept by the clock 10 and accurate display of tide is also displayed. As one example, the minute hand would be geared to rotate with an angular velocity sixty times faster than the hour hand. The hour hand would be configured to rotate about 59.061 times faster in angular velocity than the tide circle 30 (or other tide indicator). This in turn would cause the tide circle 30 or other tide indicator to rotate approximately once every 29.530575 days. For gearing simplicity, a gear ratio between the tide circle 30 and hour hand 60 can be selected to be 59.048. While this yields a small accumulation of errors over time, it also allows for gearing simplicity since 59048 equals $242\times244=2\times121\times2\times122$ which equals $2\times2\times2\times61\times121$. Therefore, gear train reduction is $8\times61\times11\times11\div10\times10\times10$.

Minute gears 86 would merely be selected to rotate sixty times faster in angular velocity than the angular velocity of the hour hand 60. The minute hand 65 could be dispensed within an alternate embodiment. Furthermore, in some embodiments a further second hand could be geared to rotate sixty times faster than the minute hand 65, such as by utilizing four concentric shafts rather than three concentric shafts 82.

Because the tide circle 30 gearing is not 100% precisely aligned with the lunar cycle, a small accumulation of error will occur over time. This accumulation of error is estimated to be an error of one day every 13.5 years, approximately. Such an error is about one part in 20,000. Over time, this error will accumulate to be potentially noticeable. Furthermore, when the clock 10 is initially set up, it may need to be adjusted to match local tide to be tracked by the clock (or some non-local tide, if a user has a particular interest in a tide status which is not local to the user).

To accommodate such adjustment, various different mechanisms can be utilized to allow the tide circle 30 to initially rotate without corresponding rotation of the hour hand 60 and any other hands of the clock 10. For instance, a tide adjustment knob 110 can be coupled to a tide adjustment shaft 112 aligned with an hour gear 114 and a flanged gear 116. When the tide adjustment knob 110 is pushed (along arrow F) the hour gear 114 associated with the shaft 112 is caused to move out of alignment with a gear train that would otherwise couple the hour gear 114 to the driver 90 and the hour hand 60. While being so pushed, the tide adjustment knob 110 can be rotated to cause the tide circle 30 to rotate without causing simultaneous rotation of the hour hand 60.

In the one embodiment disclosed, the flanged gear 116 also moves axially along arrow F and because it has a flange 117 on a perimeter thereof, also causes a tide gear 118 enmeshed with the flanged gear 116 to also move axially along arrow F, and in turn causes the tide circle 30 to move axially slightly, along arrow F. Such simultaneous pushing of the tide adjustment knob 110 along arrow F and rotation about arrow E allows for tide circle 30 adjustment until the tide circle 30 is appropriately oriented to match a desired tide to be displayed.

As one option, a local high tide (or low tide) of interest could be looked up on a local tide table. The tide circle would then be rotated until the high tide point 40 points at this time of day for the clock. Adjustment would then be complete. If the clock 10 comes out of alignment with actual tides (such as due to loss of power, accumulation of errors over time, or movement of the clock 10 from one location to a new location where a new tide is to be tracked, etc.) this adjustment protocol can be utilized.

As another alternative, the tide adjustment knob 110 can be coupled to an outer concentric shaft 112, which only pushes the hour gear 114 out of alignment relative to the hour hand 60 and driver 90, but an interior shaft about which the tide adjustment knob 110 is aligned does not get moved. In this way, the flanged gear 116 would not need the flange 117 and the tide gear 118 could be rotated by rotation of the tide adjustment knob 110, while only the hour gear 114 has been displaced to avoid simultaneous adjustment of the hour hand.

If the clock 10 requires adjustment because it is not reading time accurately, in one embodiment the hour hand 60 is merely manually grasped and rotated (along arrow A) until it points appropriately. Alternatively, the minute hand 65 could be gripped and rotated (along arrow C), in turn causing the hour hand 60 and tide circle 30 to rotate correspondingly, and for this rotation to continue until the hour hand 60 accurately reads the appropriate hour, and the minute hand 65 reads the appropriate minute. Tide circle 30 rotation along arrow B would be largely unnoticeable during such adjustment, due to the gear ratio involved.

In the example embodiment shown, the driver 90 is in the form of an electric motor with an output shaft 92 coupled to the driver 94 and receiving electric power along a power line 96 coupled to a battery 100. As an alternative, the driver 90 could be a pendulum or a clock spring. In such embodiments, a battery 100 would not be needed. Rather, the power source 100 would perhaps be elevation of weights, rotational tightening of a clock spring or otherwise adding energy into the power source that is provided as an alternative to the battery 100, for powering the driver 90 when it is in a form other than an electric motor.

In various embodiments, as is known in the clock arts generally, the gear set 80, driver 90 and battery 100 could be replaced with various different combinations of fully electric, fully mechanical, or combined mechanical and electric clockworks. In one extreme example, the tide circle 30, hour hand 60 and optional minute hand 65 (and possibly also optional second hand) could all merely be graphically displayed on an electronic display, such as an LCD or LED display, having an appearance mimicking the mechanical tide circle 30, hour hand 60 and minute hand 65. While the clock 10 is shown in this embodiment hanging on a wall W, it could rest on the floor or on some other piece of furniture, and could have an essentially endless variation in visible configurations, and still function as disclosed herein.

FIGS. 3-50 show the clock 10 at one hour intervals for two whole days. Various positions are shown to illustrate function of the clock according to this example embodiment. Note that the tide circle 30 has a very slow but noticeable angular velocity. The hour hand 60 supports the indicator window 70 as a form of tide scale to allow reading of tide details for the clock 10 time involved.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A clock for reading time and tide status, comprising in combination:

a face with a series of indicia encircling a pivot point and fixed upon said face;

an hour hand configured to rotate about said pivot point and point toward certain ones of said indicia at different times, correlating with passage of time;

a tide indicator configured to rotate about said pivot point at a first angular velocity different from a second angular velocity of said hour hand;

said tide indicator rotating at said first angular velocity about said pivot point at a ratio relative to said second angular velocity of said hour hand in accordance with natural changing of Earth's tides;

conjunction of a portion of said tide indicator with a portion of said hour hand indicating tide status;

wherein said tide indicator has a high tide point thereon which is visibly different from other portions of the tide indicator, and with high tide occurring when said high tide point intersects with said hour hand;

wherein said tide indicator includes a tide circle, and wherein said high tide point is a point on a perimeter of said tide circle, said tide circle being pivoted about said pivot point of said clock at an eccentric point of said circle;

wherein said hour hand includes a tide scale therein, with a portion of said tide circle that is adjacent to said tide scale indicative of a current magnitude of the tide;

wherein said tide scale includes an indicator window within said hour hand, with said high tide point indicating high tide when said high tide point is visible within said indicator window of said hour hand;

wherein a low tide point is located upon said tide circle on a portion of said tide circle opposite said high tide point; and wherein said high tide point is a circular protrusion and said low tide point is a circular cutout, said protrusion and said cutout each being on said perimeter of said tide circle.

2. The clock of claim 1 wherein said tide indicator is geared to said hour hand to rotate relative to said hour hand at a gear ratio of about 10:288.

3. The clock of claim 1 wherein said tide indicator rotates relative to said hour hand at a ratio of 10:288.

4. The clock of claim 1 wherein said face can be rotated relative to said hour hand and said tide indicator at least about 30° about said pivot point, to adjust said clock between standard time and daylight time.

5. The clock of claim 1 wherein a rear of the clock includes at least two separate suspension elements radially displaced about one-twelfth of a revolution from each other, said at least two suspension elements including a standard time suspension element and a daylight time suspension element.

6. The clock of claim 1 wherein said indicator window has an oblong shape with a semi-circular form at ends thereof.

7. The clock of claim 6 wherein at least one end of said window has a size and shape matching that of a convex surface of said high tide point.

8. A method for displaying status of tides, including the steps of:

displaying a clock face with a series of indicia encircling a pivot point and fixed upon the face, an hour hand configured to rotate about the pivot point and pointed toward certain ones of said indicia at different times correlating with passage of time, and a tide indicator configured to rotate about the pivot point, the tide indicator rotating slower than the hour hand by a differential within one percent of matching a degree to which Earth's tides change slower than hours pass;

reading a current status of the tide by noting which portion of the tide indicator is aligned with a portion of the hour hand;

wherein said tide indicator includes a high tide point thereon which is visibly different from other portions of the tide indicator, and with high tide occurring when the high tide point intersects with a portion of the hour hand;

wherein the tide indicator includes a tide circle, and wherein the high tide point is a point on a perimeter of the tide circle, the tide circle being pivoted about said pivot point of said clock at an eccentric point of said circle;

wherein the hour hand includes a tide scale thereon, with a portion of the tide circle that is adjacent to the tide scale being indicative of a current magnitude of the tide;

wherein the tide scale includes an indicator window within the hour hand, with the high tide point indicating high tide when the high tide point is visible within the indicator window of the hour hand;

wherein a low tide point is located upon the tide circle on a portion of the tide circle opposite the high tide point; and wherein the high tide point is a circular protrusion and the low tide point is a circular cutout, the protrusion and the cutout each being on the perimeter of the tide circle.

9. The method of claim 8 wherein the tide indicator is geared to the hour hand to rotate relative to the hour hand at a gear ratio of about 10:288.

10. The method of claim 8 including the further step of adjusting the clock between standard time and daylight time by rotating the face relative to the hour hand and tide indicator by about 30° about the pivot point.

11. The method of claim 10 wherein said adjusting step includes suspending the clock from a different one of a standard time support element and a daylight time support element, the standard time support element and the daylight time support element spaced from each other by about 30° about the pivot point.

12. The method of claim 8 wherein the indicator window has an oblong shape with a semi-circular form at ends thereof.

13. The method of claim 12 wherein at least one end of the window has a size and shape matching that of a convex surface of the high tide point.

14. The method of claim 8 wherein said reading a current status of the tide step includes viewing a fullness of the indicator window and correlating window fullness to tide height, with a full window indicating high tide and an empty window indicating low tide.

* * * * *